United States Patent

[11] 3,615,835

[72] Inventor Stanford R. Ovshinsky
    Bloomfield Hills, Mich.
[21] Appl. No. 813,777
[22] Filed Jan. 16, 1969
[45] Patented Oct. 26, 1971
[73] Assignee Energy Conversion Devices, Inc.
    Troy, Mich.
    Continuation-in-part of application Ser. No. 575,675, Aug. 29, 1966, now abandoned, which is a continuation-in-part of application Ser. No. 198,849, May 31, 1962, now abandoned.

[54] GENERATION OF DC VOLTAGE
    12 Claims, 4 Drawing Figs.
[52] U.S. Cl.................................... 136/83 R,
                                                136/86 R
[51] Int. Cl..................................... H01m 27/00
[50] Field of Search............................. 136/86, 83,
                            90, 6, 100, 120, 112–114; 73/336.5

[56] References Cited
    UNITED STATES PATENTS
    3,208,882   9/1965   Markowitz.................. 136/86
            OTHER REFERENCES
    J. M. Mellor–Inorganic Chemistry–The Nitrides pp. 97– 98
    Vol. 8 QD 31/M4 1937

Primary Examiner—Winston A. Douglas
Assistant Examiner—A. Skapars
Attorneys—Wallenstein, Spangenberg, Hattis & Strampel and Edward G. Fiorito ABSTRACT: A room temperature DC voltage generating device comprising a solid body of lithium metal carrying on and in direct contact with at least a part of its surface a solid layer of a composition consisting essentially of at least one oxygen-containing lithium compound such as lithium nitrate or lithium sulfate, or lithium chloride or lithium bromide, said solid layer being effective to prevent direct contact of a water-moisture-containing gaseous environment with said body of lithium metal in the area of said solid layer, an electrical circuit including electrical contacts respectively connecting (i) said body of solid lithium metal, and (ii) said solid layer, and means providing a water-moisture-containing gaseous environment whereby to moisten said layer, generation of DC voltage occurring on contact of said moisture with said layer.

PATENTED OCT 26 1971　　　3,615,835
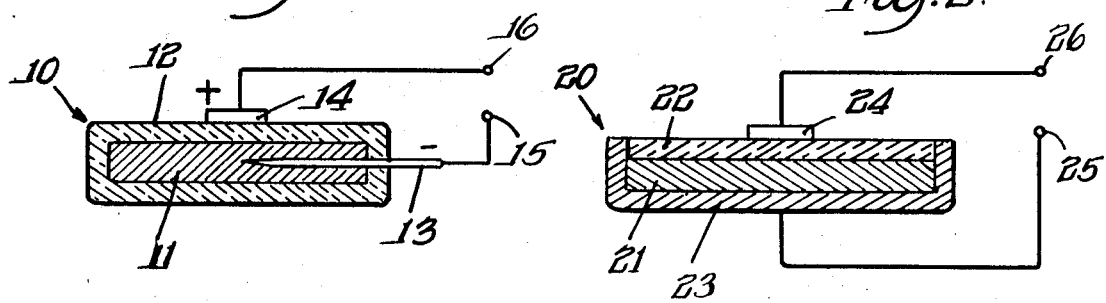
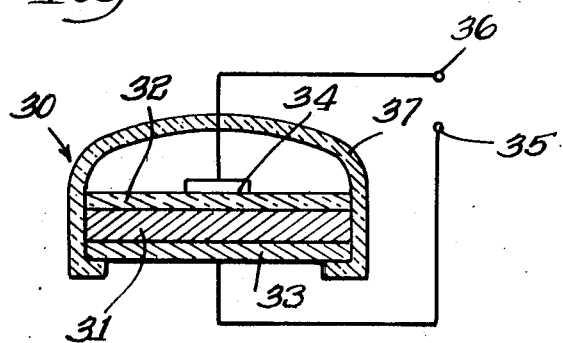
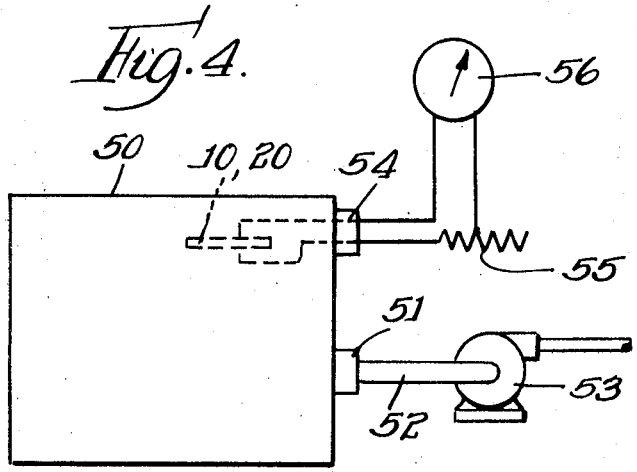
Inventor
Stanford R. Ovshinsky
By: Wallenstein, Spangenberg, Hattis & Strampel

GENERATION OF DC VOLTAGE

CROSS-REFERENCE TO RELATED APPLICATIONS

This application is a continuation-in-part of now abandoned application Ser. No. 575,675, filed Aug. 29, 1966, which is, in turn, a continuation-in-part of now abandoned application Ser. No. 198,849, filed May 31, 1962.

This invention relates to the generation of DC voltage and it involves the utilization of a solid-state voltage-generating device for producing or generating a substantial DC voltage, wherein the voltages generated are in a range of volts, which, in certain instances, may be as high as about 2 volts and may even somewhat exceed 3 volts, wherein the voltage-generating devices are operable at normal temperatures, such as room temperature, wherein the voltage-generating devices are energized by the readily available water moisture in a gaseous environment for the devices, such as the normal water moisture in the atmospheric air, wherein the voltage generated by the devices is, in most cases, dependent upon the moisture content of the gaseous environment and, hence, also provides a measure of the water moisture content of the environment, wherein the devices may further be used for measuring the vacuum condition of a water-moisture-containing gaseous environment where the moisture content of the gaseous environment decreases as the vacuum condition thereof increases, wherein the devices are small in size in relation to substantial voltages generated thereby, and wherein the devices are simple and rugged in construction, foolproof in operation and inexpensive to manufacture.

It has heretofore been known, as shown in U.S. Pat. No. 3,208,882, to generate DC voltage by a procedure wherein a stream of moist nitrogen or, in certain cases, moist air, is directed against a solid body of lithium metal, whereby progressively to convert the lithium metal to lithium nitride, electrodes being in direct contact, respectively, with (a) the body of the lithium metal and (b) the layer or body of lithium nitride. Essential to such generation of DC voltage, according to said patent, is the use of a layer of lithium nitride in direct contact with the solid body of lithium metal, made, for instance, by initial contacting of the solid body of lithium metal with moist nitrogen or, in certain cases, other moist nitrogen-containing gases such as moist air, so as to effect the production of a layer of lithium nitride in direct contact with a surface of the solid lithium metal. After application of the electrodes as aforesaid, a DC voltage is generated by passing either moist or dry nitrogen (or a source thereof such as air) into contact with the lithium nitride layered body of solid lithium metal. Where moist nitrogen or moist air is used as the source of the gaseous nitrogen, a lithium hydroxide coating forms on the solid body of lithium metal, with the lithium nitride formation proceeding inwardly toward the center, under said coating of lithium hydroxide, upon further treatment with moist air or moist nitrogen or a moist nitrogen-containing gas. The lithium hydroxide coating is not asserted to play any direct role so far as DC voltage generation is concerned but, rather allegedly functions as a protective coating to protect the interior lithium nitride from hydrolysis. The electrode (cathode) connection must be to the lithium nitride. Only low voltages are producible by such an arrangement, said patent making reference to the generation of a voltage of the magnitude of 0.15 volt.

My invention has a number of advantages over DC voltage generation devices and the method of generating DC voltage as described in the aforesaid patent. One of such advantages is the ability, in certain instances, to effect DC voltage generation of a magnitude substantially greater than 0.15 volt. Other advantages center about the avoidance of certain restrictions which are essential to the operation of said patent. Still other advantages will appear from the description of my invention to follow.

Briefly, the DC voltage generating devices of this invention include (1) a solid body, for instance, a sheet or layer, of lithium metal, and (ii) a solid layer of a composition containing as an essential ingredient, at least one lithium compound or a mixture of lithium compounds, said solid layer (ii) being essentially free from lithium nitride, said solid layer (ii) being in direct contact with at least one surface of the solid body of lithium steel. Said solid layer (ii) itself, or in combination or together with additional means, as, for instance described below, prevents contact of the water moisture gaseous environment with the body of lithium metal. As least a portion of the outer surface of said solid layer of said composition (ii) is exposed to and in contact with the water-moisture-containing gaseous environment to be moistened thereby. An electrical circuit includes electrical connections respectively contacting said body of lithium metal and the surface, particularly the outer surface, of said solid layer of said composition (ii) which is exposed to and moistened by the water-moisture-containing gaseous environment. Said body of lithium metal and said moistened layer of said composition (ii) generate the DC voltage in said electrical circuit, i.e. voltages which may, in certain instances, be in the range of volts as expressed above.

The lithium compound, or mixture of lithium compounds constituting said solid layer (ii) can be oxygen-containing lithium compounds, examples of which are lithium sulfate, lithium nitrate, lithium acetate, lithium phosphates such as lithium pyrophosphate and lithium orthophosphate, lithium silicates such as lithium metasilicate and lithium orthosilicate, and lithium borates such as lithium orthoborate and lithium metaborate. Chlorine- bromine- and iodine-containing lithium compounds exemplified by the lithium chloride, lithium bromide and lithium iodide can also be used as the solid layer (ii).

The various lithium compounds or mixtures thereof, comprising the layer of composition (ii) described above, can be coated or filmed in layers on to the body of lithium metal in a variety of ways. Thus, for example, the said lithium compounds may be fused and then coated onto the members as by the use of a doctor blade or by squeegeeing, painting, spraying or the like. Alternatively, they may be admixed with an organic resinous binder, for example, a methyl methacrylate resin, coated on, and then the binder removed, for instance, by burning off.

I have also found that, if the foregoing oxygen-containing lithium compounds include iodine as a component, the voltage generation characteristics may be considerably enhanced. THe iodine may be applied to the lithium compounds in various ways, as for example, by fuming the iodine and subjecting the lithium compounds to such fumes.

Various of the foregoing voltage generating devices also have the unique characteristic of generating a DC voltage which varies in value in accordance with the moisture content of the gaseous environment, in those cases where the layer of the composition (ii) which is exposed to and in contact with the water moisture containing gaseous environment has the property of both taking up water moisture from and losing water moisture to the gaseous environment. The generated voltages may change from the range of as high as about 1 to about 3 volts, in certain instances, for high water moisture values (90–95% R.H.) to the range of about 0.1 to 0.3 volts for low water moisture values (30% R.H.) and such changes are generally quite consistently reversible. In this connection, it may be noted that, where lithium chloride or lithium bromide is utilized, layers of such compositions will not always lose water moisture to the gaseous environment when the water moisture content of the gaseous environment decreases. As a result, the DC voltage generation will not always decrease upon decrease in the water moisture content of the gaseous atmosphere, as will the devices utilizing the other aforementioned lithium compounds.

Further objects of this invention reside in the constructions of and compositions utilized in the DC voltage generating devices, in the cooperative relationships among the component parts thereof, the method of effecting generation of DC voltage thereby, and the utilization of the arrangements for measuring and indicating vacuum conditions.

Other objects and advantages of this invention will become apparent to those skilled in the art upon reference to the accompanying specification, claims and drawing in which:

FIG. 1 is an illustration showing one form of the voltage-generating device of this invention;

FIG. 2 is a diagrammatic illustration showing another form of the voltage-generating device;

FIG. 3 is a diagrammatic illustration showing a further form of the voltage-generating device; and FIG. 4 is a diagrammatic illustration showing the manner of utilizing certain of the voltage-generating devices of this invention as a vacuum-responsive device.

Referring first to FIG. 1, one form of the voltage-generating device of this invention is generally designated at 10. It includes a body of lithium metal in the form of a sheet or disc or layer 11 which has been coated with a solid layer or film 12 of any of the aforementioned compositions (ii). This layer or film 12 of lithium compounds may also include iodine, the iodine being incorporated therein in the manner described above. A needle electrode 13 is inserted into the lithium metal body 11 so as to be in contact therewith and an electrode 14 is suitably secured to and contacts the outer surface of the lithium compound coating or layer or film 12. The electrodes 13 and 14 are connected respectively to terminals 15 and 16. The solid layer 12 of the composition prevents contact of a water-moisture-containing atmosphere with the body 11 of lithium metal.

When the device 10 of FIG. 1 is subjected to a gaseous moisture-containing environment, which may be moist air or another water-moisture-carrying gas which may be a gas in which free nitrogen is essentially absent, for instance, argon, carbon dioxide, neon, or the like, the coating or film or layer 12 is moistened thereby and it takes up moisture from and loses moisture to the environment in accordance with the moisture content of the environment (except generally as indicated above in the case of lithium chloride and lithium bromide). The lithium metal body 11 and the moistened coating or film or layer 12 generates a substantial DC voltage which is transmitted from the electrodes 13 and 14 to the terminals 15 and 16, the terminal 16 being positive with respect to the terminal 15. The value of the DC voltage appearing at the terminals 15 and 16 depends upon the moisture content of the coating or film or layer 12 and hence upon the moisture content of the gaseous environment therefor. When the device 10 is subjected to an environment, such as atmospheric air, having a high moisture content, say 60 to 80% R.H., the device 10 operates to produce DC voltages across the terminals 15 and 16 and, depending also upon the particular lithium compound or mixtures utilized, may be in the volt range and may even exceed about 3 volts. As the moisture content of the gaseous environment decreases, the voltage generated by the device 10 correspondingly decreases and, therefore, the device 10, in addition to being a simple and powerful DC voltage generator, may also operate as a device for producing a DC voltage in accordance with the moisture content of the gaseous environment so as to provide a means for measuring the moisture content of the gaseous environment.

Another form of the voltage-generating device is generally designed at 20 in FIG. 2. It includes a solid body, in the form of a layer or sheet or disc 21, of lithium metal inserted in the bottom of a cup- or dish-shaped member 23 which is formed of electrically conducting material, such as metal or the like, the lithium metal 21 making electrical contact with the member 23. A solid layer or coating or film 22 of a composition containing at least one lithium compound, or mixtures, of the kinds described above, is supplied to the body 21 of lithium metal, it being applied in any suitable manner as indicated previously. The compositions may also be tamped or pressed into the member 23 against the body 21 of lithium metal. An electrode 24 is suitably applied to the outer surface of the layer 22 of the composition, and the electrode 24 and the body 21 are connected by leads to terminals 26 and 25. The member 23 and the layer 22 of the composition prevent contact of the water-moisture-containing atmosphere with the body 21 of lithium steel. The outer surface of the composition layer is exposed to and contacted by the water-moisture-containing gaseous environment and the device 20 of FIG. 2 operates to generate substantial DC voltage in the same manner as discussed above in connection with the device 10 of FIG. 1.

The voltage-generating devices of FIGS. 1 and 2 may be stored before use by encapsulating them in a water-moisture-proof container so that they will not be subject to water-moisture until ready for use. When ready for use, they are removed from such container and subjected to the gaseous environment to generate substantial DC voltages in accordance with the water-moisture content thereof.

A further form of the voltage-generating device of this invention is generally designated at 30 in FIG. 3, this device 30 being capable of use in atmospheres where little or no moisture is present and where the atmospheres may have a detrimental effect upon the lithium compound compositions utilized therein. Here, a body 31 of lithium metal, in the form of a sheet or disc or layer, is provided with a layer or coating or film 32 of a composition containing at least one lithium compound, or a mixture thereof, of the kinds described above, the layer or coating or film 32 being applied to the body 31 of lithium metal in any suitable manner as described above. The body 31 of lithium metal is suitably secured to a sheet or disc 33 of a nonlithium metal, such as copper, steel or the like. This nonlithium metal sheet or disc 33 is in electrical contact with the body 31 of lithium metal so as to form an electrode therefor. Another electrode 34 is suitably secured to and contacts the outer surface of the lithium compound layer or coating or film 32 and the electrodes 33 and 34 are connected by leads to terminals 35 and 36.

A cover or closure 37 encapsulates the body 31 of lithium metal and the lithium compound composition 33 and it may comprise a substantially liquid- and gas-impervious material, such as glass, synthetic plastic or the like. The cover or closure 37 is suitably secured and sealed to the metal sheet or disc 33. The interior of the cover or closure 37 is provided with a gaseous atmosphere which does not react unfavorably with the lithium compound composition and the lithium metal and it has a high moisture content so as to moisten the layer or film 32 of the lithium compound composition. The lithium compound composition 32 takes on such moisture and the moistened lithium compound composition operates in conjunction with the lithium metal to generate substantial DC voltages across the terminals 35 and 36 as discussed above in conjunction with FIG. 1. Thus, in FIG. 3, the cover or closure 37 maintains a supply of moisture in contact with the layer or film 32 so as always to generate a substantial voltage at the terminals 35 and 36 regardless of what the moisture content of the atmosphere about the device 30 may be. The cover or closure 37 also protects the lithium metal and the lithium compound composition from any adverse effects of such atmosphere. For storage purposes the gaseous atmosphere within the cover or closure 37 may be substantially dry, and, when it is desired to utilize the voltage generating device, a suitable amount of water moisture may be introduced into the atmosphere within the cover or closure 37. For example, where the cover or closure is formed of a synthetic plastic, the water moisture can be introduced by a syringe suitably inserted through the cover or closure.

FIG. 4 illustrates the manner of utilizing the voltage-generating devices 10 or 20 of FIGS. 1 and 2 for measuring and indicating vacuum conditions. Here, a container or tank 50 carries a moisture-containing gas and it is connected through a coupling 51 and a pipe 52 to a vacuum pump 53 which operates to produce a vacuum in the tank or container 50. As the pump 53 is operated, a moisture-containing gas is pumped from the tank or container 50 to produce a vacuum therein. In so doing, moisture is withdrawn from the tank along with the gas and the moisture content of the gas remaining in the tank is proportional to the vacuum drawn in the tank. A voltage-generating device 10 or 20 of the kinds illustrated in FIGS. 1 and 2 is placed in the tank so as to respond to the moisture content of the gas in the tank. The device 10 or 20 has leads extending through a suitable coupling 54 in the tank which are connected through an adjustable resistance 55 to a meter 56. Thus, the device 10 or 20 generates a voltage in accordance with the moisture content of the gas in the tank 50 and hence the vacuum condition therein and this voltage so produced is indicated by the meter 56. The meter 56 may be calibrated to indicate the degree of vacuum in the tank 50 and the calibration of the meter may be effected by the adjustable resistance 55.

The DC voltage generating devices of the present invention are most desirably operated at room or ambient temperatures. They can, however, be operated at lower temperatures as well as at higher temperatures. In general, it is particularly preferred that they be operated at temperatures in the range of about 20° to about 60° C.

While, for purposes of illustration, several forms of this invention have been disclosed, other forms thereof will become apparent to those skilled in the art upon reference to this disclosure and, therefore, this invention is to be limited only by the scope of the appended claims.

I claim:

1. A method of generating DC voltage which comprises:
   a. providing a device comprising a solid body of lithium metal carrying on, and in direct contact with, at least a part of its surface, a solid layer of a composition consisting of at least one oxygen-containing lithium compound selected from the group consisting of lithium sulfate, lithium nitrate, lithium acetate, lithium phosphate, lithium silicate, lithium borate, and chlorine-, bromine- and iodine-containing lithium compounds selected from the group consisting of lithium chloride, lithium bromide and lithium iodide, said solid layer being effective to prevent direct contact of a water-moisture-containing gaseous environment with said solid body of lithium metal in the area of said solid layer, electrical connections being provided contacting, respectively, (i) said body of solid lithium metal, and (ii) said solid layer and forming part of an electrical circuit, and
   b. subjecting the outer surface of said layer to a water-moisture-containing gaseous environment whereby to cause generation of DC voltage.

2. The method of claim 1, in which the gaseous environment is air.

3. The method of claim 1, in which the gaseous environment comprises a gas in which free nitrogen is essentially absent.

4. The method of claim 1, in which the DC voltage generated is in the range of about 1 to about 3 volts.

5. The method of claim 1, in which the generation of the DC voltage is effected at a temperature in the range of about 20° to about 60° C.

6. The method of claim 1, in which the generated voltage is controlled by controlling the water moisture content of the gaseous environment.

7. A DC voltage generating device which generates a voltage of a temperature in the range of about 20° to about 60° C. comprising:
   a. a solid body of lithium metal carrying on, and in direct contact with, at least a part of its surface, a solid layer of a composition consisting of at least one oxygen-containing lithium compound selected from the group consisting of lithium sulfate, lithium nitrate, lithium acetate, lithium phosphate, lithium silicate, lithium borate, and chlorine-, bromine- and iodine-containing lithium compounds selected from the group consisting of lithium chloride, lithium bromide and lithium iodide, said solid layer being effective to prevent direct contact of a water-moisture containing gaseous environment with said solid body of lithium metal in the area of said solid layer,
   b. an electrical circuit including electrical contacts respectively connecting (i) said body of solid lithium metal, and (ii) said solid layer, and
   c. means providing a moisture-containing gaseous environment whereby to moisten said layer.

8. A voltage-generating device according to claim 7, which is effective to generate a substantial DC voltage at a temperature in the range of about 20° to about 60° C., and in which the gaseous environment is air.

9. A voltage-generating device according to claim 8 in which the DC voltage is in the range of volts for a water-moisture content in said gaseous environment in the range of 90 to 95% R.H., and in the range of a volt for water moisture contents below 30% R.H.

10. A voltage-generating device according to claim 7, in which said water-moisture-containing gaseous environment to which said solid layer of said composition is exposed has its water moisture content varied in accordance with the vacuum condition thereof, and wherein said body of lithium metal and said moistened layer of said composition generate a substantial DC voltage in said electrical circuit in accordance with the water moisture content and hence the vacuum condition of the gaseous environment.

11. A voltage-generating device according to claim 7, in which the solid lithium metal is in the form of a sheet or disc and is disposed within and in electrical contact with a cup- or dish-shaped member of an electrically conducting material, the solid composition layer being disposed on an exposed surface of said solid lithium metal sheet or disc, the electrical contact to said solid lithium metal sheet or disc being through said cu or dish-shaped member.

12. A room temperature voltage-generating device comprising a solid body of lithium metal, a solid layer of a composition consisting essentially of at least one chlorine-, bromine- or iodine-containing lithium compound in intimate contact with at least one surface of the body of lithium metal, means including said solid layer of said composition for preventing contact of a water moisture containing gaseous environment with the body of lithium metal, at least a portion of the outer surface of said solid layer of said composition being exposed to and in contact with a water moisture containing gaseous environment to be moistened thereby, and an electrical circuit including electrical connections respectively contacting said body of lithium metal and the outer surface of said solid layer of said composition which is exposed to and moistened by the water moisture containing gaseous environment, said body of lithium metal and said moistened layer of said composition generating a substantial DC voltage in said electrical circuit.